United States Patent Office 3,267,743
Patented August 23, 1966

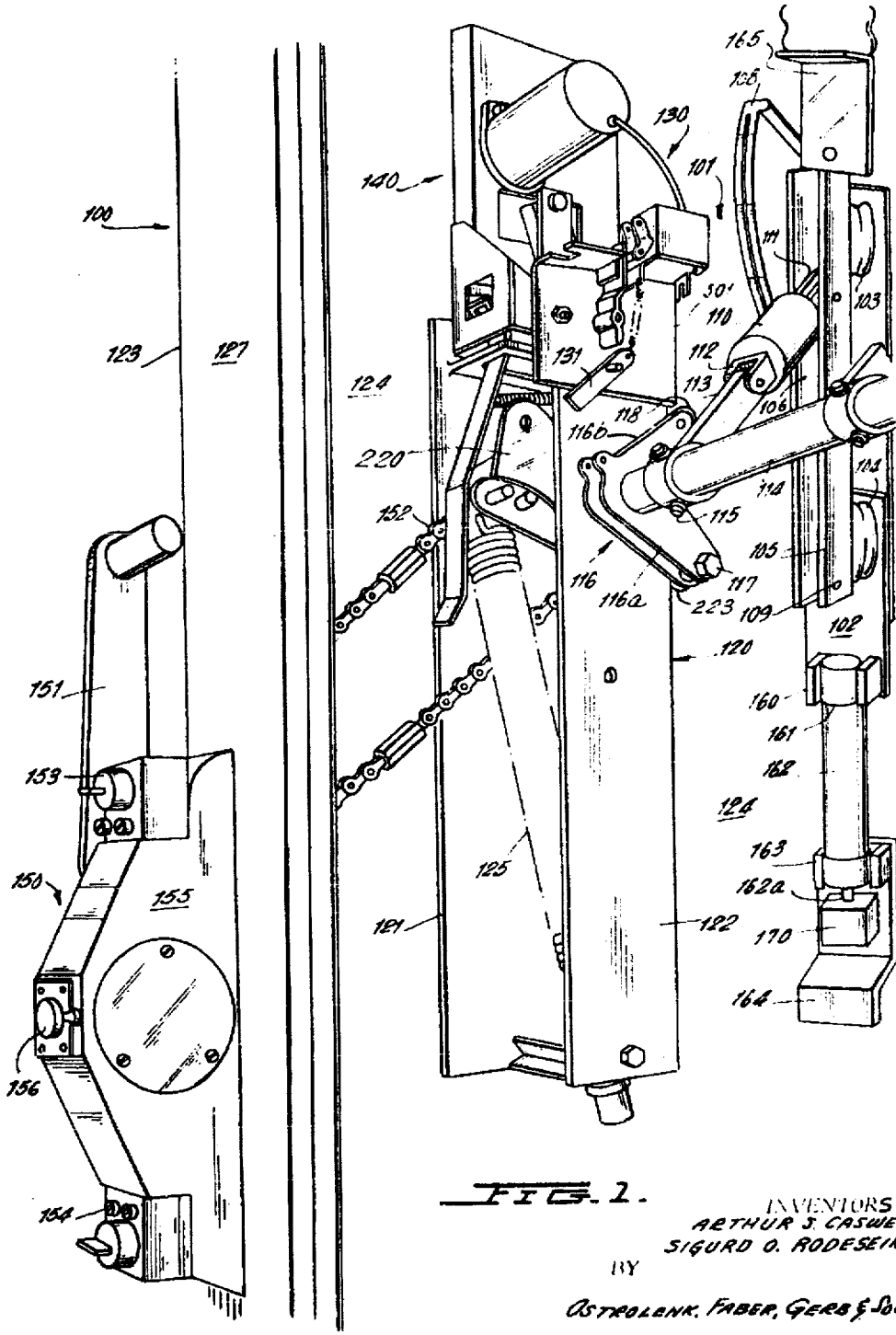

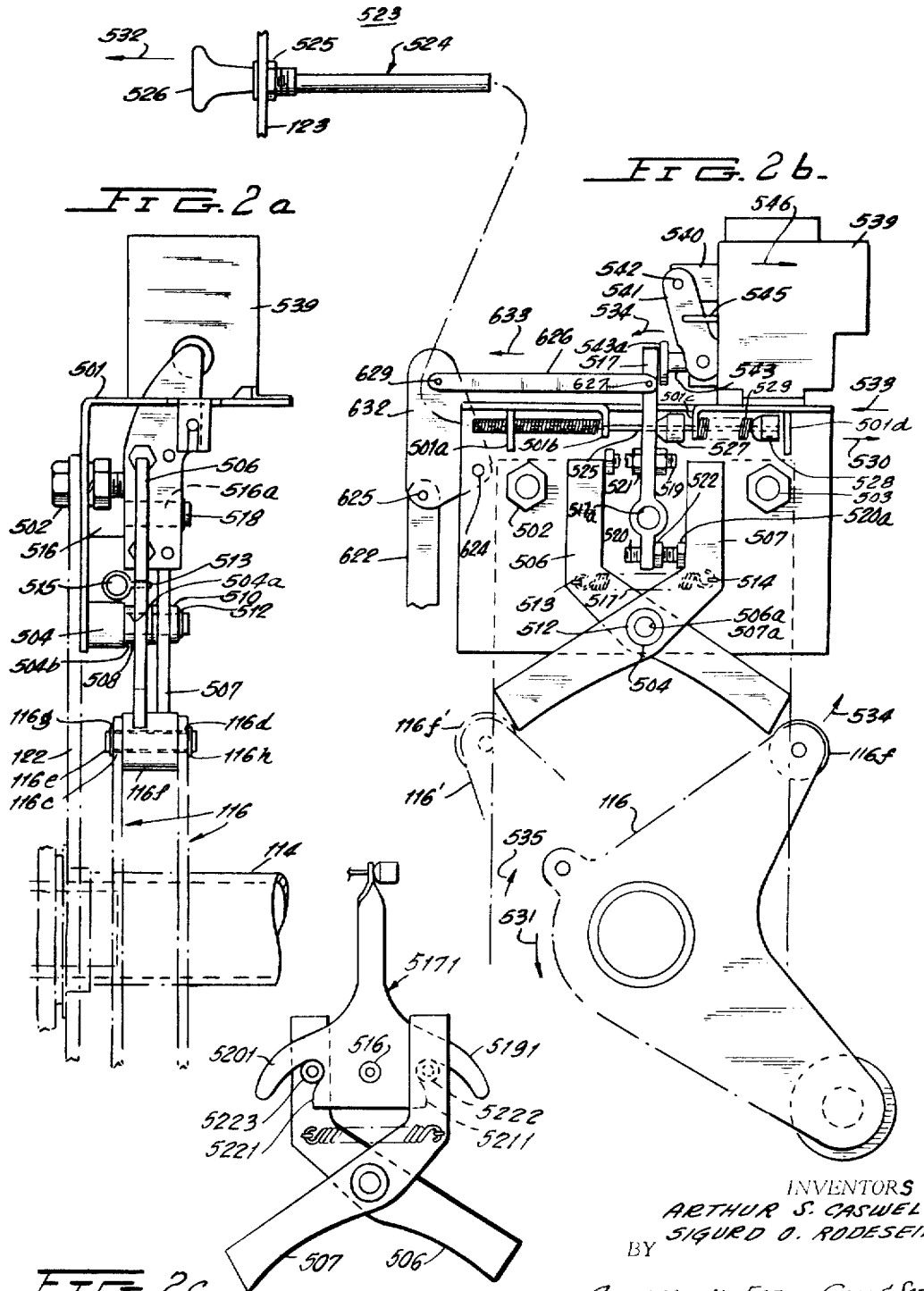

---

3,267,743
LATCH MEANS FOR SPRING OPERATOR
Arthur S. Caswell and Sigurd O. Rodeseike, both of Greensburg, Pa., assignors to I-T-E Circuit Breaker Company, Philadelphia, Pa., a corporation of Pennsylvania
Filed Oct. 22, 1965, Ser. No. 500,793
7 Claims. (Cl. 74—2)

This application is a continuation-in-part of United States co-pending patent application Serial No. 290,059, entitled "Spring Operator Means," filed June 24, 1963, in the names of Arthur S. Caswell and Sigurd O. Rodeseike, and assigned to the assignee of the instant invention.

This invention relates to load interrupter switches for power distribution systems, and more particularly to load interrupter switches employing novel spring operator means for controlling the opening and closing of such switches wherein the novel operator means is comprised of a system of unique modular elements which may be arranged in varying combinations to provide as many or as few features as may be desired.

In power distribution systems, protective means in the form of circuit breakers are employed for the purpose of isolating a portion, or portions, of the distribution system from the energy source upon the occurrence of overload or severe fault current conditions. After the tripping of such circuit breakers, in order to further isolate the portion, or portions, of the distribution system, load interrupting switches are employed, which switches are manually operated to the open circuit condition to isolate a portion, or portions, of the distribution network from the energy source during the period in which the fault condition is being corrected and cleared. While such load interrupter switches are designed so as to isolate a portion or portions of the network after tripping of a circuit breaker, it is nevertheless desirable to provide load interrupter switches with the capability of being rapidly operated to both the open and closed position since the possibility may exist that the closing and/or opening operation may be performed accidentally or otherwise during the time in which the circuit connected to the load interrupter switch is energized.

In the aforementioned parent application Serial No. 290,059 there is shown and described a spring operator for load interrupter switches wherein a single compressible spring means is provided to swiftly operate the load interrupter switch means to both the open and closed, or connected and disconnected positions.

The basic spring operator device is comprised of a pivotally mounted arm having its free end connected to the compressible spring means and is designed to rotate about a shaft to which it is secured. The arm may be operated by manual means connected to a chain drive which imparts rotation to both shaft and arm by means of a sprocket wheel. The spring means is moved to and beyond an overcenter position in which position it is in the fully charged condition. Upon reaching the overcenter condition, the spring discharges its stored energy to rapidly close or open the load interrupter switch, depending upon the position of the spring means before the charging operation. The spring means, in discharging, drives a second arm secured to a shaft to which one or a plurality of connecting links are ganged. Each such connecting link has its opposite end pivotally linked with an associated load interrupter switch blade member to operate the blade member to either the connected or disconnected position, depending upon the direction of rotation of the shaft operated by the spring operator means.

The spring operator means may also be driven to the compressed position by motor operated means, which may be electrically energized either locally or at some remote location.

In many cases it is desired to move the spring to the fully charged position, without, however, immediately performing the rapid opening or closing operation.

The instant invention is directed to that particular problem and provides novel latch means for latching the spring means in a compressed position, which upon release thereof permits the rapid opening or closing operation to be performed. The latch means is comprised of first and second latching members arranged in a scissors-like fashion for latching the spring in both the compressed position in readiness for rapid closing operation and the compressed position in readiness for a rapid opening operation. Each latch member is positioned to bear against a pivotally mounted roller member affixed to the arm controlling the shaft to which all of the load operating switch blades are ganged. The latches may be released either by manual or electrical means so as to disengage the latch member from the pivotally mounted roller member to permit the rapid opening or closing operation. The latch means may be readily mounted to the spring operator without any modification whatsoever and either or both of the latch members may be removed or inserted, depending only upon the needs of the user.

It is thus seen that an object of the instant invention is to provide a novel spring operator for load interrupter switches and the like having a latching device for latching the spring operator in either the spring charged to open or spring charged to closed position.

Still another object of the instant invention is to provide novel spring operator means for load interrupter switches and the like comprising novel latch means for latching the spring operator compressible spring in either the spring charged to open or the spring charged to closed position, wherein the latch means is comprised of a scissors-like arrangement of latch members which may be alternatively controlled by either manual or electrical means.

These and other objects of the instant invention will become apparent when reading the accompanying description and drawings, in which:

FIGURE 1 is a perspective view of a load interrupter switch under control of a spring operator means designed in accordance with the principles of the instant invention;

FIGURES 2a and 2b are end and side elevational views of the latch means shown in FIGURE 1; and FIGURE 2c is a partial side view of an alternative embodiment of a portion of FIGURE 2b.

Referring to the drawings, FIGURE 1 shows a ganged load interrupter switch installation 100 controlled by a spring operator means designed in accordance with the principles of the aforementioned parent application Serial No. 290,059. As explained in greater detail in that application, the installation 100 is comprised of a plurality of vertically mounted load interruping switches such as, for example, the switch 101 which is mounted to a vertical support 102 by means of insulator members 103 and 104. Switch 101 is comprised of a pivotally mounted main blade 105 and arcing blade 106, which is designed to come into engagement with the main contact 107 and the arcing contact (not shown) contained within the arc quenching chute 108, respectively. The main blade is pivoted at point 109 under control of insulating connecting arm 110 which is pivotally connected to blade 105 at 111 and further, pivotally connected at its opposite end 112 to rotatable arm 113. Rotatable arm 113 is keyed to shaft 114 by means of threaded members 115 so as to impart any rotational movement experienced by shaft 114 to the lever arm 113. The load interrupter switches described herein may be any configuration similar to that shown in FIGURE 1 and the design lends no novelty to the system of the instant invention. Typical load interrupter switches which may be utilized in the spring operator means of the instant invention are set forth in copending application Serial No. 287,309 and Serial No. 286,661, both of which are assigned to the assignee of the instant invention, which describe the configurations and operations of such load interrupter switches in greater detail.

One, or a plurality of such load interrupter switches may be ganged to the operating shaft 114, in a manner similar to that described above. By ganging in this manner, a plurality of such load interrupter switches may be simultaneously operated to the open or closed positions, under control of a single spring operator means, in a manner to be more fully described. Typical examples of ganged installations would be a ganging of three such load interrupter switches to a single shaft for protecting a three-phase power distribution system. It should be understood, however, that a greater or lesser number of such load interrupter switches may be ganged to shaft 114.

The shaft 114 is journalled to rotate about its extreme left and right-hand ends (the bearing at the right-hand end not being shown in FIGURE 1) and is operated by the spring operator means which is connected to shaft 114 by the substantially L-shaped operating arm assembly 116 which is keyed to shaft 114 in any suitable manner. Both arms 116a and 116b of assembly 116 act as one, both being secured to shaft 114 by a welding operation. Both arms 116a and 116b, together with drive 220, support the roller 223 by virtue of fastening means 117 which also connects assembly 116 to drive 220 of spring operator 120.

The spring operator means 120 is comprised of first and second vertically positioned mounting plates 121 and 122, between which the spring operating means 120 is mounted. The spring operating means rear mounting plate 121 is rigidly bolted to the wall 124 of cubicle 123 which houses the load interrupter switches as well as the spring operating means.

Further explanation of the spring operator may be had by referring to the aforementioned parent application Serial No. 290,059, which is incorporated herein by reference thereto.

The spring operating means 120 may be charged by motor driven means 140 mounted atop the spring operator means 120 in a manner shown in FIGURE 1, so as to charge the compressible spring 125 in order to rapidly operate the load interrupter switches to both the connected and disconnected positions. Further explanation of the motor driven means 140 may be had by referring to United States co-pending application Serial No. 290,058, entitled "Spring Operator Motor Charging Means," filed June 24, 1963 in the name of Arthur S. Caswell and assigned to the assignee of the instant invention. The subject matter of that application is incorporated herein by reference thereto.

The discharge of the compressible spring 125 drives the operating member 116, in a manner to be more fully described in order to rotate shaft 114 which imparts its rotational movement to the blades, such as, for example, the blade 105 of the load interrupter switches ganged to shaft 114. Shaft 114 may rotate in both the clockwise and counterclockwise directions to perform both rapid opening and closing operations.

Also mounted atop the spring operator 120 is the latch means 130 of the instant invention which is provided with latch members, such as, for example, latch member 131 which cooperates with the roller member 118 of the operating member 116, to latch the compressible spring 125 in the spring charged to open and the spring charged to closed positions in a manner to be more fully described. The latching means 130 is designed to be operated both manually and electrically by means to be more fully described.

In addition to the motor operated spring charging means 140, spring 125 may be compressed or charged by the manual charging means 150 vertically mounted along the outer wall 127 of cubicle 123. The manual charging means 150 is operated by handle 151 and is coupled to spring operator means 120 by means of chain drive 152, which engages sprocket wheels contained in both manual charging means 150 and spring operator means 120 which sprocket wheels are not shown in FIGURE 1. The manual charging means is further provided with first and second locking means 153 and 154 which are designed to lock the spring operator means and hence the load interrupter switches in both the open and closed positions or any combination thereof by the novel interlock means (not shown) contained within the manual charging means housing 155. Housing 155 is provided with a window 156 beneath which an indicator ring (not shown) is positioned, in order to provide a visual indication of the condition of the spring operating means 120 and hence the load interrupter switches which the spring operator means controls. Further detail of the manual charging means 150 may be had by referring to United States co-pending application Serial No. 289,863 entitled "Spring Operator Manual Charging Means," filed June 24, 1963, in the name of Sigurd O. Rodeseike and assigned to the assignee of the instant invention. The subject matter of that application is incorporated herein by reference thereto.

Although the spring operator means in the installation 100 of FIGURE 1 is shown mounted against the left-hand wall of cubicle 123, the spring operator means is sufficiently versatile so as to be mounted against the right-hand wall of the cubicle, which installation can be performed by a very simple reversal of parts so as to operate the shaft 114 for opening and closing operations of the load interrupter switches in the same manner as previously described. In a like manner, the manual charging means 150 may also be positioned along the right-hand side of front wall 127 of the cubicle 123. It can clearly be seen from the arrangement of FIGURE 1 that the four basic elements of the spring operating means, namely, the spring operator 120, the latch means 130, the motor driven charging means 140 and the manual charging means 150, are all modular type units and may be readily assembled into the system either upon manufacture thereof or right at the field installation where the spring operator means is to be employed. In addition thereto, any of the modular units may be removed or inserted after the initial installation to increase or decrease the number of functions desired by the user, thereby providing an extremely flexible spring operator installation.

FIGURES 2a and 2b show the latch means 130 of the instant invention which can also be seen in FIGURE 1, which latch means is employed to latch the spring operator device in the spring charged to open and/or the spring charged to closed positions. The latch means is mounted to the front vertical supporting plate 122 of the spring operator means which rigidly secures an L-bracket 501 of the latch means 130 to plate 122 by the fastening means 502 and 503. The L-bracket has a cylindrical shaped post 504 secured near its lower end, which post forms a narrower cylindrical portion 504a projecting outwardly from bracket 501. The cylindrical portion 504a is adapted to extend through suitable openings 506a and 507a in latch members 506 and 507, respectively. The latch members 506 and 507 are mounted upon cylindrical portion 504a in the following manner:

A first hub member 508 is positioned on cylindrical portion 504a so that it rests against shoulder 504b of post 504. The latch member 506 is then positioned on the hub 508. A second hub member 510 is then positioned on portion 504a. The latch member 507 is then positioned on second hub member 510 and a washer 512 is positioned on cylindrical portion 504a atop latch member 507. A suitable fastening member 512 is then positioned on cylindrical portion 504a atop latch member 507 to secure the entire assembly upon post 504a. Latch members 506 and 507 are provided with pins 513 and 514, respectively, which extend through suitable apertures in the fastening means in the direction towards vertical plate 122, as can best be seen in FIGURE 2a. Pins 513 and 514 are adapted to receive the opposite ends of a spring member 515 in a manner shown in FIGURE 2b, which spring member acts to bias latch member 507 counterclockwise about post 504 and acts to bias latch member 506 clockwise about post 504. Therefore, in the normal position, latch members 506 and 507 occupy the positions as shown in FIGURE 2b. L-bracket 501 is provided with a second post 516 affixed thereto which also tapers to a narrower cylindrical portion 516a. Mounted on portion 516a is a latch release member 517 provided with an aperture 517a for receiving post portion 516a. A suitable fastening member 518 is provided for the purpose of securing latch release member 517 to post 516. The latch release member 517 is provided with two suitable apertures provided for receiving threaded bolts 519 and 520. Each bolt is provided with a bolt head 519a and 520a, respectively, which are positioned so as to abut against the inside edges of latch members 506 and 507, respectively, as shown in FIGURE 2b. In order to retain the bolt members 519 and 520 after adjustment thereof nuts 521 and 522, respectively, are provided to threadedly engage bolts 519 and 520 and to bear against the latch release member 517 to maintain bolts 519 and 520 in the adjusted positions.

The latch means 130 is provided with manual operating means 523 which is comprised of a flexible cable 524 having a substantially flexible wire 525 running through the center of a flexible cable. A first end of the flexible wire 525 (not shown) extends through a suitable opening in the cubicle wall 123 which is provided with fastening means 501a for securing the flexible cable 524 thereto. The flexible wire 525 is affixed to a knob 526 in any suitable manner. The opposite end of flexible wire 525 is affixed to first and second stop members 527 and 528, stop member 528 being affixed to the end of flexible wire 525. The L-bracket 501 is provided with a plurality of flanges 501a–501d for positioning and supporting flexible cable 524 and flexible wire 525. Flange 501a is provided with a suitable aperture for supporting flexible cable 524 while flanges 501b and 501c support the flexible wire 525. Flange 501d acts as a stop means against which stop member 528 abuts. A spring member 529 is provided on flexible wire 525 so that a first end thereof abuts against stop member 528 and a second member thereof abuts against flange 501c. With the arrangement shown in FIGURE 2b biasing spring 529 acts to urge stop member 528 in the direction shown by arrow 530. This maintains the latch means 130 in the normal unoperated position as shown in FIGURE 2b. The release operation for latch members 506 and 507 is as follows:

As previously described, the connecting crank assembly 116 is rigidly affixed to shaft 114 to which the load interrupter switches are ganged. The connecting crank is comprised of first and second members each having suitable apertures 116c and 116d for receiving a pin 116e. Mounted on pin 116e and between the members 116 is a roller member 116f. Pin 116e is rigidly secured into place by the fastening members 116g and 116h. Let it be assumed that a charging operation has been initiated in order to charge the spring operator means to rapidly close the load interrupter switches. During this charging operation the spring operator means acts to rotate the connecting crank 116 counterclockwise in the direction shown by arrow 531. The connecting crank 116 continues such counterclockwise rotation until the roller member 116f bears against the lower edge of latch member 506 as shown in FIGURE 2b. In this position the compressible spring of the spring operator has been fully charged and has slightly passed the dead center position as previously described so that it is now ready to release its stored energy in order to initiate the charging operation. However, in the presence of the latch member 506 the compressible spring is unable to release its stored energy due to the fact that roller member 116f abuts against the latch member 506. In order now to perform the rapid closing operation, the knob 526 is grasped and pulled in the direction shown by arrow 532. This causes the opposite end of the flexible wire 525 to move in the direction shown by arrow 533 causing stop member 528 to be urged against the spring means 529 and causing stop member 527 to be urged against the latch releasing member 517. As the stop member 527 is drawn against a latch release member 517, this causes latch reelase member 517 to be urged counterclockwise in a direction shown by arrow 534 about its pivot 517a. This rotation drives the heads of bolts 519 and 520 against the inner edges of latch member 506 and 507, causing latch member 507 to rotate clockwise and causing latch member 506 to rotate counterclockwise. The rotation of latch member 506 counterclockwise causes its lower end to move in the direction shown by arrow 534a such that its lower edge which rollingly engages roller member 116f rolls out of engagement with roller 116f so that the roller member 116f may pass beneath latch member 506. Due to the fact that the compressible springs are fully charged at this time, this permits the connecting crank 116 to rapidly move in the counterclockwise direction, as shown by arrow 531 in order to rapidly rotate shaft 114. The rotation of shaft 114 causes a rapid opening operation upon all of the load interrupter switches which are ganged on shaft 114. At the end of the opening operation, the roller member 116f rotates to a position well beyond the lower edge of latch member 507. The spring operator means is now available to perform a rapid closing operation upon the load interrupter switches. The rapid closing operation is performed as follows:

In order to perform such a rapid closing operation, the connecting crank 116, in its new position, must be rotated in the clockwise direction, as shown by arrow 535 until its roller member 116f shown in the dotted position 116f' bears against the lower edge of latch member 507. In this position, the compressible springs pass the dead center position and are fully available to perform a rapid closing operation. However, this is prevented by roller member 116f' which abuts against latch member 507. In order to perform the rapid closing operation, the knob 526 is grasped and pulled in the direction shown by arrow 532. This causes stop means 527 to be pulled against latch release member 517, driving the bolts 519 and 520 against the latch members 506 and 507, respectively, rotating them, respectively, in the counterclockwise and clockwise directions. The rotation of latch member 507 in the clockwise direction causes its lower end, which is rollingly engaging roller member 116f' to roll out of engagement with roller 116f' so that the roller member may freely pass beneath the latch member 507. At this instant of time the connecting crank 116 is then available to rotate rapidly in the clockwise direction, as shown by arrow 535, to rotate shaft 114, in order to rapidly move the load interrupter switches ganged to shaft 114 to the closed, or connected position.

In order to electrically operate the latch means 130, solenoid means 539 is provided which is rigidly secured to L-bracket 501 in any suitable manner. The solenoid 539 is connected to a suitable source of electrical energy (not shown) in order to operate its armature 540. The armature 540 is pivotally connected to a connecting link 541 by a pin means 542. The opposite end of connecting link 541 is connected to a short push rod 543 by a pin member 544. A bracket 545 is affixed to the solenoid 539 and is provided with a suitable slot (not shown) for receiving connecting links 541. Bracket 545 acts as a fulcrum for connecting link 541 in a manner to be more fully described. The push rod 543 is provided with a flat head 543a which is positioned adjacent the upper end of latch release member 517.

Electrical operation of the latch means 130 is as follows:

The solenoid 539 is provided with bias means (not shown) so that when deenergized the solenoid 539 occupies the position as shown in FIGURE 2b. Upon energization thereof, armature 540 is drawn inward in the direction shown by arrow 546. This pulls the upper end of connecting link 541 in the same direction. The bracket 545, which acts as a fulcrum, causes connecting link 541 to pivot about the fulcrum 545, driving the lower end of connecting link 541 in the direction shown by arrow 633. This motion is imparted to the push rod 543 which bears against latch release member 517 to urge it in the counterclockwise direction. The counterclockwise motion of latch release member 517 acts to drive the latch members 506 and 507 in the counterclockwise and clockwise directions, respectively, in the same manner as previously described, so as to release the connecting crank 116 in the same manner as previously described, in order to permit the compressible spring of the spring operator means to release its stored energy. The latch members 506 and 507 are returned to their normal positions, (the positions shown in FIGURE 2b) by means of the spring biasing member 115 affixed to latch members 506 and 507 by the pins 513 and 514, respectively, so as to urge these latch members in the clockwise and counterclockwise directions, respectively.

In FIGURE 2c is shown an alternative embodiment of the instant invention wherein the latch release member 517 has been replaced by a one-piece latch release member 5171 which materially reduces the number of parts of, and provides more reliable operation over, the multipiece construction which includes latch release member 517 and bolts 519 and 520.

The one-piece latch release member 5171 includes two outstanding arcuate arms 5191 and 5201 and two cammed surfaces 5211, 5221. Arcuate arm 5191 together with cammed surface 5211, and arcuate arm 5201 together with cammed surface 5221, cooperate with rollers 5222 and 5223, respectively, to rotate latch members 506 and 507 in opposite directions in response to rotation of latch release member 5171 about post 516 by either manual or electrical operating means.

Since operation of the latch assembly is identical for the new one-piece latch release member 5171, it will not be repeated. It should be noted that the new one-piece latch release member 5171 provides a pre-fixed, non-adjustable assembly with better operating cams than that of the assembly of FIGURE 2b.

As can clearly be seen, the latch means 130 may be very readily assembled upon the spring operator means vertical plate 122 so as to provide the spring operator means with a latching mechanism having the capability of latching the spring operator in the spring charged to open and/or the spring charged to closed positions, respectively. If it is desired to have only one such capability, either one of the latch members 506 and 507 may be removed without affecting in any way the operation of the latch mechanism 130. Thus, for example, if any installation of load interrupter switches is provided with the spring operator means having a latch mechanism 130 with only one of the latch members 506, it becomes a very simple task to add the latch member 507 to provide the installation with the further capability of providing latching capabilities for both the spring charged to open and the spring charged to closed operations. Likewise, the latch mechanism 130 may be provided with either the manual or electrical latch releasing means, or both, depending only upon the needs of the user and either of these latch mechanism actuating means may be added at any later date to provide an installation with further capabilities.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; a manual actuating means for rotating said latch releasing lever in a direction to move said latch releasing lever away from said stop means; the rotation of said latch releasing member moving said latch member to release said spring means from the compressed position.

2. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; manual actuating means for rotating said latch releasing lever in a direction to move said latch releasing lever away from said stop means; the rotation of said latch releasing member moving said latch member to release said spring means from the compressed position; a second latch member being pivoted about said first pin at a point intermediate its ends; said biasing means being connected to said second latch member at a point intermediate its ends for urging said second latch member in a second direction; said latch releasing member abutting said latch member; one end of said second latch member being positioned to abut said spring lever arm when said latch releasing lever abuts said stop means to latch said spring means in a second compressed position; said latch releasing lever being rotatable under control of said manual actuating means to rotate said second latch member in a direction to release said spring means from the compressed position.

3. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; manual actuating means for rotating said latch releasing lever in a direction to move said latch releasing lever away from said stop means; the rotation of said latch releasing member moving said latch member to release said spring means from the compressed position; said manual actuating means comprising a flexible cable; a flexible wire positioned through said cable and projecting beyond both ends of said flexible cable; handle means connected to a first end of said flexible wire; said latch releasing lever having an aperture adjacent one end thereof; the second end of said flexible wire extending through said aperture; a stop member affixed to said wire second end and positioned to abut said latch releasing lever adjacent said aperture; said stop member being adapted to rotate said latch releasing member when said handle means is pulled in a first direction to release said latch member from engagement with said spring lever arm.

4. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; manual actuating means for rotating said latch releasing lever in a direction to move said latch releasing lever away from said stop means; the rotation of said latch releasing member moving said latch member to release said spring means from the compressed position; said manual actuating means comprising a flexible cable; a flexible wire positioned through said cable and projecting beyond both ends of said flexible cable; handle means connected to a first end of said flexible wire; said latch releasing lever having an aperture adjacent one end thereof; the second end of said flexible wire extending through said aperture; a stop member affixed to said wire second end and positioned to abut said latch releasing lever adjacent said aperture; said stop member being adapted to rotate said latch releasing member when said handle means is pulled in a first direction to release said latch member from engagement with said spring lever arm; a second stop member affixed to said flexible wire; second biasing means abutting said second stop member to urge said handle in a direction opposite said first direction.

5. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; manual actuating means for rotating said latch releasing lever in a direction to move said latch releasing lever away from said stop means; the rotation of said latch releasing member moving said latch member to release said spring means from the compressed position; energizable solenoid means having an armature; a motion transferring linkage connected to said armature at one end thereof and abutting said latch releasing member at the opposite end thereof for rotating said latch releasing lever upon energization of said solenoid to release said first latch member from engagement with said spring lever arm.

6. Latch means for use in latching a spring means having a spring lever arm mounted to rotate about a shaft and spring means linked at one end to said spring lever arm and being restrained from linear movement at the opposite end thereof, comprising, a first pin; a first latch member being pivoted about said first pin at a point intermediate its ends; a second pin; a latch releasing lever being pivoted about said second pin at a point intermediate its ends; biasing means for urging said first latch member in a first direction to cause said first latch member to abut said latch releasing lever at a first end thereof; stop means for preventing said latch releasing lever from rotating under control of said first latch member; one end of said first latch member being positioned to abut said spring lever arm when said latch releasing lever abuts said stop means to latch said spring means in a first compressed position; manual actuating means for rotating said latch releasing lever in a direction to move said latch releasing lever away from said stop means; the rotation of said latch releasing member moving said latch member to release said spring means from the compressed position; said manual actuating means comprising a flexible cable; a flexible wire positioned through said cable and projecting beyond both ends of said flexible cable; handle means connected to a first end of said flexible wire; said latch releasing lever having an aperture adjacent one end thereof; the second end of said flexible wire extending through said aperture; a stop member affixed to said wire second end and positioned to abut said latch releasing lever adjacent said aperture; said stop member being adapted to rotate said latch reelasing member when said handle means is pulled in a first direction to release said latch member from engagement with said spring lever arm; a second stop member affixed to said flexible wire; second biasing means abutting said second stop member to urge said handle in a direction opposite said first direction; solenoid means having an armature; a motion transferring linkage connected to said armature at one end thereof and abutting said latch releasing member at the opposite end thereof for rotating said latch releasing lever upon energization of said solenoid to release said first latch member from engagement with said spring lever arm; said solenoid means being operable independently of said manual actuating means.

7. The latch means of claim 2, wherein said first and second latch members each include a roller mounted thereon, and said latch release member comprises a one-piece member having a pair of outstanding arcuate arms and a pair of cammed surfaces, one of said arms and one of said cammed surfaces cooperating with each of said rollers to rotate said latch members in opposite directions in response to rotation of said latch release member in a predetermined direction.

References Cited by the Examiner
UNITED STATES PATENTS

| | | | |
|---|---|---|---|
| 1,208,863 | 12/1916 | Waldow | 74—2 |
| 2,174,969 | 10/1939 | Collings | 74—2 |
| 2,586,075 | 2/1952 | Miller | 200—70 |
| 2,960,297 | 11/1960 | Cotter et al. | 74—2 X |
| 2,991,658 | 7/1961 | Haessler et al. | 74—2 |
| 3,071,010 | 1/1963 | Lupkas | 74—97 X |

MILTON KAUFMAN, *Primary Examiner.*

D. H. THIEL, *Assistant Examiner.*